United States Patent [19]
Free, Jr.

[11] Patent Number: 6,158,374
[45] Date of Patent: Dec. 12, 2000

[54] SHOCK ABSORBING DEVICE FOR MOORING AND TOWING APPLICATIONS

[75] Inventor: William F Free, Jr., Ruleville, Miss.

[73] Assignee: E-Zsea Surge, LLC, Drew, Miss.

[21] Appl. No.: 09/568,467

[22] Filed: May 10, 2000

[51] Int. Cl.$^7$ ................................................... F16G 11/00
[52] U.S. Cl. ..................... 114/215; 267/71; 114/230.2; 114/253
[58] Field of Search ................. 267/69–71; 114/213, 114/215, 230.1, 230.2, 230.22, 230.24, 253; 119/769, 770, 783, 784, 792, 797, 798

[56] References Cited

U.S. PATENT DOCUMENTS

| | | |
|---|---|---|
| 202,522 | 4/1878 | Clark . |
| 483,762 | 10/1892 | Crippen . |
| 3,610,606 | 10/1971 | Andrews . |
| 4,627,375 | 12/1986 | Davis et al. . |
| 4,681,303 | 7/1987 | Grassano ................................. 267/71 |
| 5,158,270 | 10/1992 | Lin . |
| 5,307,753 | 5/1994 | Besonen, Sr. et al. . |
| 5,694,879 | 12/1997 | Taylor . |

*Primary Examiner*—Ed Swinehart
*Attorney, Agent, or Firm*—Larson & Taylor, PLC

[57] ABSTRACT

A shock absorber device is provided for use in absorbing sea surges in mooring and marine towing applications at sea. The device includes a unitary anchor member disposed in a housing. The anchor member includes a rod having an eyelet at one end thereof for attachment to a shackle and a plurality of laterally extending flange members spaced along the length thereof for securing the member in the housing. A unitary piston member, including a rod including a flange or piston plate at one end thereof and an eyelet at the opposite end, is mounted in the housing so as to enable rotation of the piston member about the axis of the rod of the piston member. A coil spring surrounds a portion of the rod of the piston member. The piston member and coil spring are received in a cavity in the housing such that a first end of the coil spring abuts the flange of the piston member and the opposite end of the coil spring abuts an inwardly facing end wall of the cavity. With this arrangement, a pulling force of sufficient magnitude exerted on said rod will cause compression of the coil spring by the flange of the piston member to produce dampening of the pulling force.

18 Claims, 3 Drawing Sheets

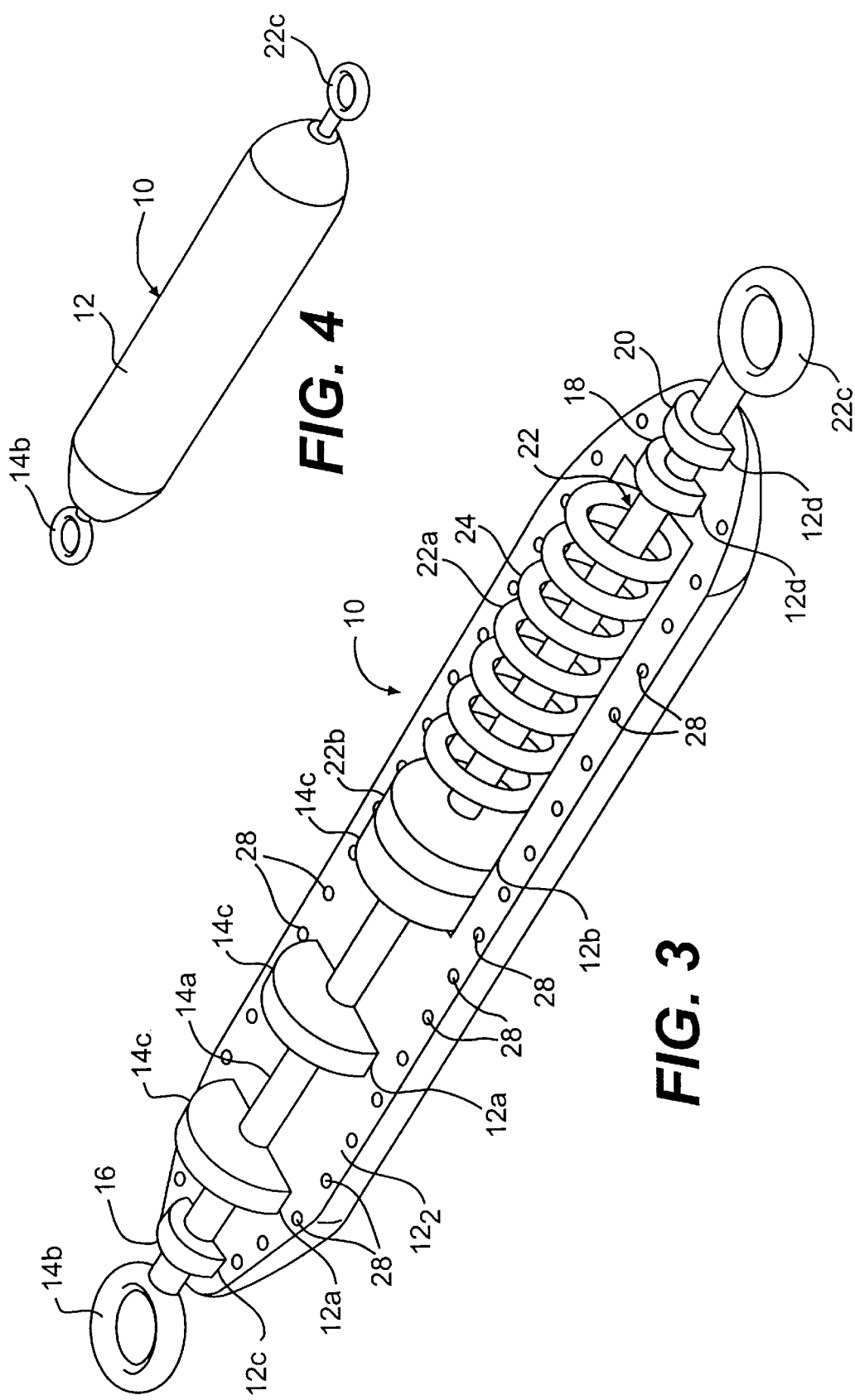

SHOCK ABSORBING DEVICE FOR MOORING AND TOWING APPLICATIONS

FIELD OF THE INVENTION

The present invention relates to mooring and towing systems for use in mooring offshore oil rigs and platforms, and by ocean going towing vessels in marine towing, and more particularly, to an improved shock absorbing device that overcomes or substantially reduces the problems associated with shock absorber systems currently in use for these applications.

BACKGROUND OF THE INVENTION

The mooring systems which are conventionally used with offshore oil rigs and platforms typically consist essentially of a wire clamped around an aircraft tire and/or shackled to a padeye. This wire is used to secured the mooring lines for the oil rigs and platforms . It has been my experience that over a relatively short period of time, these wires cut through the tire, bringing the whole rigging down. The lines and the tires consistently fail because of the surge motion of the associated vessels caused by wind and seas. In many instances, the loose rigging then gets fouled up in the shafts and screws of the vessel. The problems caused by these failures are enormous. Crew members have been injured and even killed by the fallen rigging and other consequences of mooring line failure. In addition, the sucking of the lines and/or tires into the screws and shafts of a supply or utility vessel can cost thousands of dollars (and, in my experience, has collectively cost millions of dollars) on vessel down time and repair. Further, the cost of a coil of mooring line of the type used on offshore oil rigs and ocean going towing vessels can itself easily exceed twenty thousand dollars.

A further huge and costly problem is that produced when the shock line of an ocean towing vessel breaks on the high seas. The consequences of a runaway petroleum barge running aground, or millions of dollars of cargo containers washing up at a remote location, can be catastrophic, both, economically, for boat and cargo owners and insurance companies alike, and, environmentally, particularly where there is an attendant oil spill. The shock lines used in these ocean going towing operations are made of nylon, normally have a diameter of about six to eight inches and typically come in 50, 100 and 150 lengths. When a nylon line stretches to one half of its length, the line will break, and will snap back to its original diameter. It will be appreciated that when one of these large diameter lines hits a crewman, there is usually little hope for survival. This dire situation is compounded by the fact that even if the crewman survives the initial incident, medical help must be flown out to the vessel and this, of course, reduces the chances of survival. Although such nylon lines are, of course, very strong, such factors as a failure of the tugboat crew to keep the towing wires and bridles greased, and the inevitable weathering of the shock lines, have all too often meant that a sudden surge, brought on by a huge sea or wind, has caused the line to snap, thus unleashing the possibilities of all of the unfortunate consequences that can potentially occur (including that of a 400,000 barrel oil barge running aground).

In addition to the other disadvantages described above, such shock lines can take four to five hours to unreel from a storage drum or reel on deck and require substantial storage space.

SUMMARY OF THE INVENTION

In accordance with the invention, a shock absorbing device is provided that overcomes or eliminates the problems associated with the systems discussed above that are currently used for mooring and towing applications. In this regard, the device of the invention is extremely rugged and durable as well as easier to install and safer to handle. Further, the device remains flexible in all kinds of weather and resists attack from sea water and sunlight. When used for towing, the device requires significantly less storage space than the currently used shock lines described above and is only approximately one-tenth of the weight of such a shock line (which weight increases as the line gets wet). Further, the invention provides a swivel and spring action described below that enables easier movement of the lines and avoids twisting and kinking of the lines.

According to one aspect of the invention, a shock absorber device is provided for use in mooring and towing applications at sea, said device comprising: a housing; a one piece, unitary anchor member disposed in the housing and comprising a rod including an eyelet at one end thereof for attachment to a shackle and a plurality of laterally extending flange members spaced along the length of the rod and received in respective cavities in said housing; a one piece, unitary piston member comprising a rod including a flange at one end thereof, and an eyelet at a second, opposite end for attachment to a shackle, the piston member being mounted in the housing so as to enable rotation of the piston member about the axis of rod of the piston member; and a coil spring surrounding a portion of said rod of said piston member, the piston member and the coil spring being received in a further cavity in said housing such that a first end of said coil spring abuts said flange of said piston member and a second, opposite end of said coil spring abuts an inwardly facing end wall of said further cavity so that a pulling force of sufficient magnitude exerted on said rod will cause compression of said coil spring by said flange of said piston member to produce dampening of the pulling force.

In a preferred implementation, the housing is fabricated of urethane. Advantageously, the device further comprises a cylindrical casing received in the further cavity and surrounding the piston member and the coil spring. Preferably, the device further comprises a first seal member received in a further cavity in the housing at a first end of housing and surrounding a portion of the rod of the anchor member, and a second seal member received a further cavity in the housing at a second, opposite end of the housing and surrounding a portion of the rod of the said piston member.

The housing preferably comprises first and second halves affixed together at mating surfaces by a plurality of fasteners provided at spaced locations around peripheral edges of the mating surfaces. More generally, the housing preferably comprises first and second housing portions releasably joined together at mating surfaces thereof. Advantageously, the device further comprises seal means for providing waterproof sealing of the mating surfaces of the housing portions. The said seal means preferably comprises respective mating grooves respectively formed in said mating surfaces and an o-ring sealing gasket received in the mating grooves.

In a preferred implementation, the anchor member includes three of said flanges spaced along the length thereon. The three flanges advantageously comprise flat cylindrical plates centered on the rod. The three flanges preferably include a distal flange at the distal end of the rod of the anchor member opposite to the one end and the distal flange is received in the further cavity in the housing.

In accordance with a further aspect of the invention, a shock absorber device is provided for use in absorbing sea surges in mooring and marine towing applications at sea, the device comprising:

a two-piece housing comprising first and second housing members joined together at flat, opposed, longitudinally extending mating surfaces;

seal means disposed at the mating surfaces for providing a waterproof seal at those mating surfaces;

a one piece, unitary anchor member disposed in the housing and comprising a rod including an eyelet at one end thereof for attachment to a shackle and at least three laterally extending flange disposed members at spaced locations along the length of said rod and centered on the rod, the flanges being received in respective cavities in said housing so that the anchor member is secured in place within said housing;

a one piece, unitary piston member comprising a rod including a flange at one end thereof, and an eyelet at a second, opposite end for attachment to a shackle, said piston member being mounted in said housing so as to enable rotation of the piston member about the rod of the piston member; and a coil spring surrounding a portion of the rod of the piston member, the coil spring being of cylindrical shape and the piston member and the coil spring being received in a further, cylindrical cavity in the housing such that a first end of the coil spring abuts said flange of the piston member and a second, opposite end of the coil spring abuts an inwardly facing end wall of the further cavity whereby a pulling force of sufficient magnitude exerted on the rod will cause compression of the coil spring by said flange of the piston member to produce dampening of the pulling force.

As in the first implementation, the housing is preferably fabricated of urethane, and the device further comprises a cylindrical casing received in the further cavity and surrounding the piston member and the coil spring.

The seal means preferably comprises respective mating grooves respectively formed in said mating surfaces and an elongate sealing gasket received in said mating grooves.

In addition, the device advantageously comprises a first seal member received in a further cavity in the housing at a first end of housing and surrounding a portion of the rod of said anchor member, and a second seal member received a further cavity in said housing at a second, opposite end of said housing and surrounding a portion of the rod of said piston member.

Preferably, the three flanges comprise flat cylindrical plates centered on the rod, and the three flanges include a distal flange at the distal end of the rod of the anchor member opposite to said one end and the distal flange is received in said further cavity in the housing.

Further features and advantages of the present invention will be set forth in, or apparent from, the detailed description of preferred embodiments thereof which follows.

BRIEF DESCRIPTION OF THE DRAWINGS

FIG. 3 is a perspective view of the embodiment of FIG. 2, with the top housing or containment member removed; and FIG. 4 is a perspective view, drawn to a reduced scale, of the device of FIGS. 1 to 4, showing the outer appearance thereof.

DESCRIPTION OF THE PREFERRED EMBODIMENTS

Figure 1:
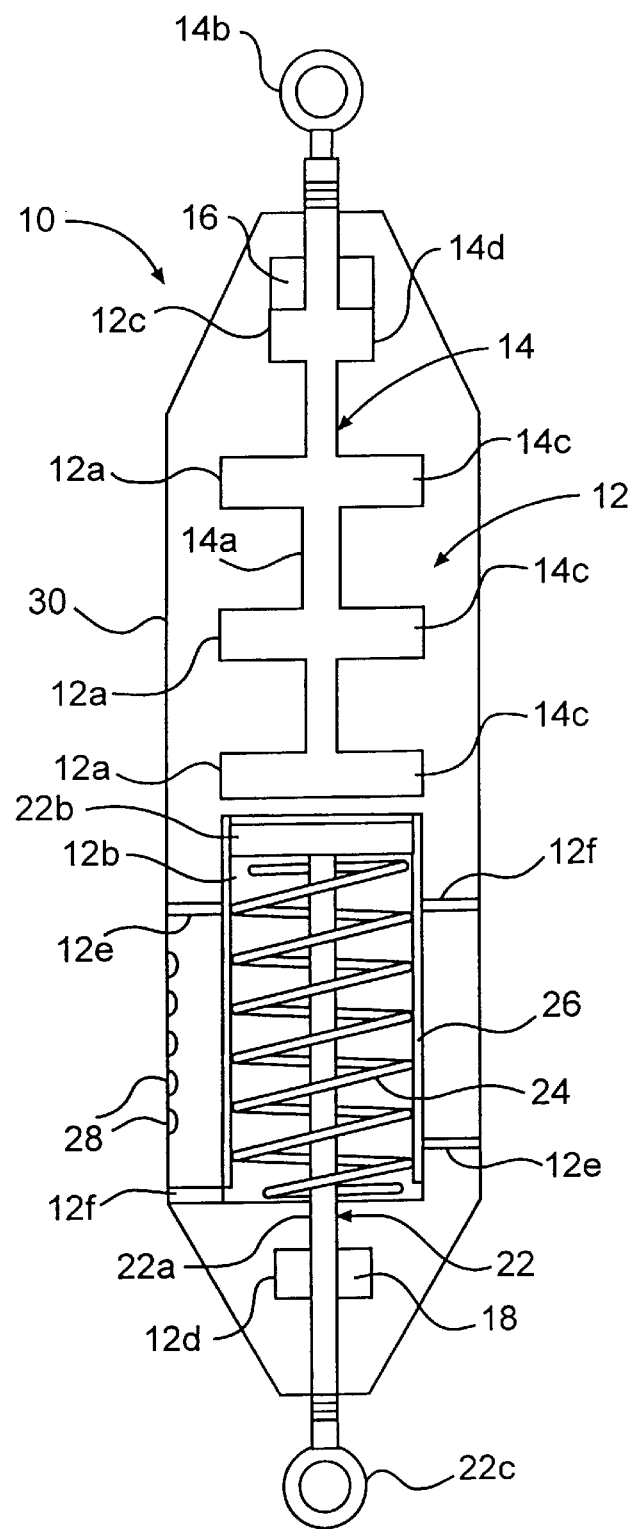
FIG. 1 is a top plan view of a first embodiment of the shock absorber device of the invention, with the top half of the housing removed.
Figure 2:
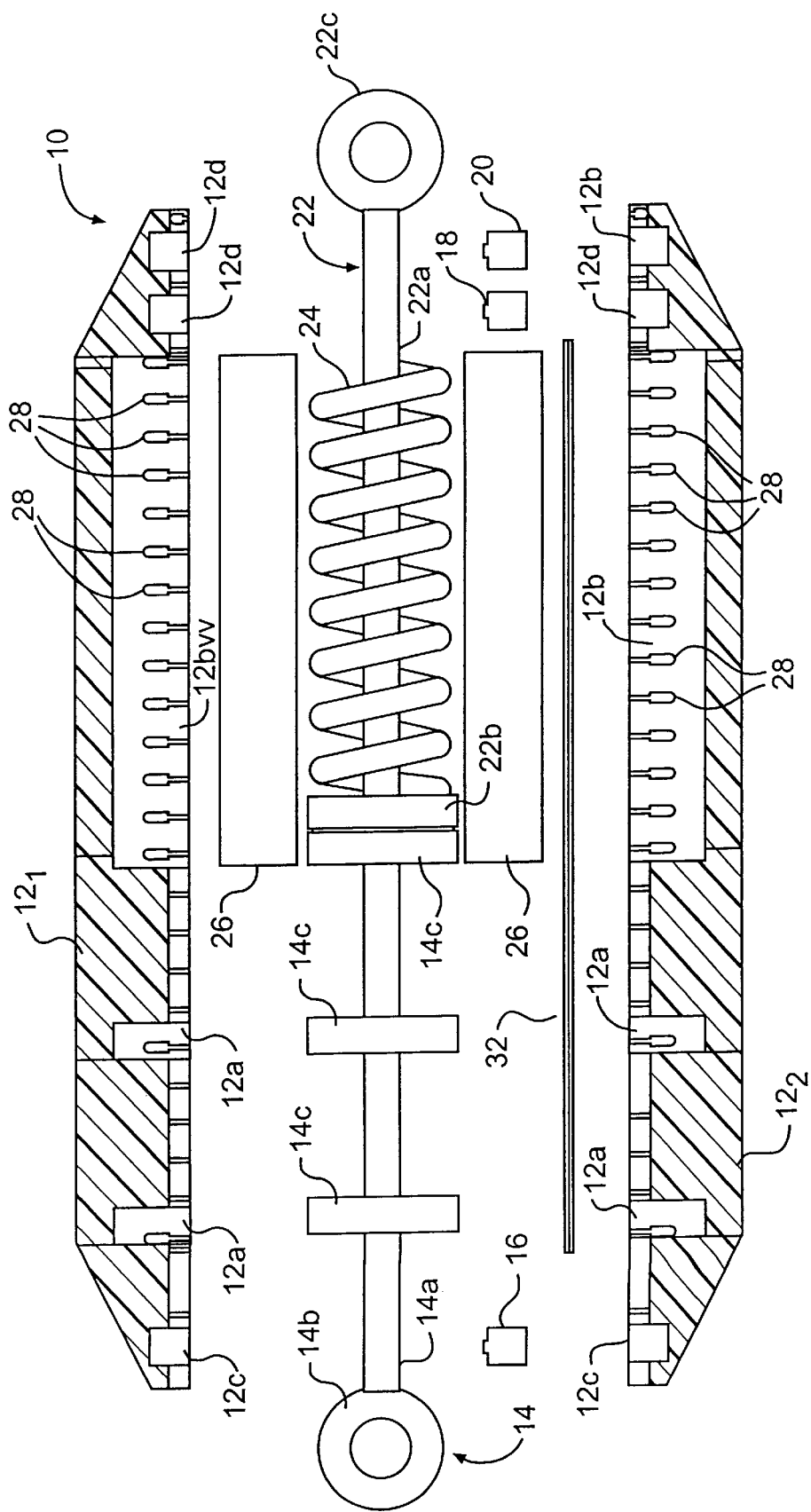
FIG. 2 is an exploded side elevational view of a further, similar embodiment of the shock absorber device of the invention.

Referring to FIGS. 1 to 3, a shock absorber device, generally denoted 10, is shown which is constructed in accordance with preferred embodiments of the invention. As indicated above, device 10 is specifically intended for use in the enormously demanding applications referred to hereinbefore, e.g., mooring oil rigs and platforms and towing ocean going vessels, and is consequently of a very rugged construction. The shock absorber device 10 includes a housing 12 preferably made of urethane. Although urethane is strongly preferred because of its hardness and durability, it is also possible to use another hard plastic material of comparable qualities and characteristics. Housing 12 is made up of two halves $12_1$ and $12_2$ (see FIG. 2) which fit together to form the complete housing 12. A two piece housing construction is preferred because this permits disassembly of the device and replacement of parts, as needed.

An anchor 14, of a solid, one piece construction made of poured steel, includes a rod portion 14a having an eyelet 14b at the end thereof and a plurality of flanges 14c along the length thereof. The embodiment shown in FIG. 1 is slightly different from that shown in FIGS. 2 and 3 in that, in the former, a further small flange 14d is provided at the eyelet end thereof while this flange is omitted in FIGS. 2 and 3. In a preferred implementation, three spaced flanges 14c are used, as shown.

As shown in FIG. 2, both halves $12_1$ and $12_2$ of housing 12 include a series of spaced cavities or recesses 12a in which flanges 12c are received. In FIG. 1, three cavities 12a are provided, while in FIGS. 2 and 3, two cavities 12a are used while a further, longer cavity 12b receives the distalmost flange 12c. (In FIG. 1, as illustrated, cavity 12b is formed separately from the third flange-receiving cavity 12a.) An additional cavity or recess 12c is provided at the anchor end of each of the housing members $12_1$ and $12_2$ for receiving a seal member 16 while two similar additional cavities or recesses 12d are provided at the opposite end for receiving two further seals 18 and 20. In the embodiment of FIG. 1, cavity 12c receives both flange 14d and seal member 16 and only one cavity 12d is provided for receiving a single seal member 18. Seal members 18 and 20 are preferably conventional grease seals.

A second, piston member 22 includes a rod 22a having a cylindrical flange or piston plate 22b at the distal end thereof and a shackle eyelet 22c at the opposite, proximal end thereof. Member 22 is also of a one piece, non-welded construction and is preferably made of poured steel. A coil spring 24 surrounds rod 22a and opposite ends of spring 24 abut against flange 22b and the facing end wall of cavity 12b, respectively. As shown in FIG. 2, a two piece, cylindrical casing or canister 26 (not shown in FIG. 3) houses spring 24 and piston member 22 and the complete assembly fits into cavity 12b.

It will be understood that when a pulling force, such as produced by sea surge is exerted by a line (not shown) shackled to eyelet 22c, flange 22b will compress coil spring 24 and the pulling force will be dampened by spring 24 in the general manner of an automobile shock absorber.

It will also be appreciated that rod 22a and flange 22b can swivel or rotate within casing 26 in response to a twisting force exerted on eyelet 22c by a line (not shown) shackled to eyelet 22c and this arrangement helps prevent kinking or twisting of the line.

As shown in FIG. 1, a pair of grease fittings 12e can be provided in housing 12 in the vicinity of cavity 12b together with a corresponding pair of grease vents 12f.

Housing halves 12₁ and 12₂ are joined together at mating surfaces by a series of bolts and nuts (not shown) provided in closely spaced relation around the mating peripheries of housing halves 12₁ and 12₂ as indicated by bolt holes 28. A groove, a portion of which, denoted 30 is shown in FIG. 1, provided in each of these mating surfaces, and an elongate gasket, indicated at 32 in FIG. 2, fits into groove 30 to provide a water seal between the halves 12₁ and 12₂. This water seal preferably extends completely around the periphery of the mating surfaces of housing halves 12₁ and 12₂ to provide complete sealing together of the two halves.

Referring to FIG. 4, there is shown a perspective view of the device 10 as fully assembled. As illustrated, only eyelets 14b and 22c are exposed and is evident from the foregoing, housing 12 is otherwise completely sealed.

Although the shock absorber of the invention is obviously not limited to these parameters and the device can be scaled up and down in size, it is thought to be helpful to consider a specific exemplary implementation of the embodiments described above to provide some idea of the size of the device that is contemplated for a typical application. In this implementation, the total length of housing is 96" (eight fee) with cavities 12a, 12c and 12d having a length of 3' and cavity 12b having a length of 41.38', the anchor member 14 is 56.33'×12', with a diameter of flange 22a being 12', the coil spring is 35.35'×11.5', and the seals 16, 20 and 20 are 3'×6' seals.

Although the invention has been described above in relation to preferred embodiments thereof, it will be understood by those skilled in the art that variations and modifications can be effected in these preferred embodiments without departing from the scope and spirit of the invention.

What is claimed is:

1. A shock absorber device for use in mooring and towing applications, said device comprising:
    a housing;
    a one piece, unitary anchor member disposed in said housing and comprising a rod including an eyelet at one end thereof for attachment to a shackle and a plurality of laterally extending flange members spaced along the length of said rod and received in respective cavities in said housing;
    a one piece, unitary piston member comprising a rod including a flange at one end thereof, and an eyelet at a second, opposite end for attachment to a shackle, said piston member being mounted in said housing so as to enable rotation of the piston member about the axis of said rod of the piston member; and
    a coil spring surrounding a portion of said rod of said piston member, said piston member and said coil spring being received in a further cavity in said housing such that a first end of said coil spring abuts said flange of said piston member and a second, opposite end of said coil spring abuts an inwardly facing end wall of said further cavity so that a pulling force of sufficient magnitude exerted on said rod will cause compression of said coil spring by said flange of said piston member to produce dampening of the pulling force.

2. A device according to claim 1 wherein said housing is fabricated of urethane.

3. A device according to claim 1 further comprising a cylindrical casing received in said further cavity and surrounding said piston member and said coil spring.

4. A device according to claim 1 further comprising a first seal member received in a second further cavity in said housing at a first end of housing and surrounding a portion of the rod of said anchor member, and a second seal member received in a third further cavity in said housing at a second, opposite end of said housing and surrounding a portion of the rod of said piston member.

5. A device according to claim 1 wherein said housing comprises first and second halves affixed together at mating surfaces by a plurality of fasteners provided at spaced locations around peripheral edges of the mating surfaces.

6. A device according to claim 1 wherein said housing comprises first and second housing portions releasably joined together at mating surfaces thereof.

7. A device according to claim 6 further comprising seal means for providing waterproof sealing of said mating surfaces of said housing portions.

8. A device according to claim 7 wherein said seal means comprises respective mating grooves respectively formed in said mating surfaces and an o-ring sealing gasket received in said mating grooves.

9. A device according to claim 1 wherein said anchor member includes three of said flanges spaced along the length thereon.

10. A device according to claim 9 wherein said flanges comprise flat cylindrical plates centered on said rod.

11. A device according to claim 9 wherein said three flanges include a distal flange at the distal end of the rod of the anchor member opposite to said one end and wherein said distal flange is received in said further cavity in said housing.

12. A shock absorber device for use in absorbing sea surges in mooring and marine towing applications at sea, said device comprising:
    a two-piece housing comprising first and second housing members joined together at flat, opposed, longitudinally extending mating surfaces;
    a seal means disposed at said mating surfaces for providing a waterproof seal at said mating surfaces;
    a one piece, unitary anchor member disposed in said housing and comprising a rod including an eyelet at one end thereof for attachment to a shackle and at least three laterally extending flange disposed members at spaced locations along the length of said rod and centered on said rod, said flanges being received in respective cavities in said housing so that the anchor member is secured in place within said housing;
    a one piece, unitary piston member comprising a rod including a flange at one end thereof, and an eyelet at a second, opposite end for attachment to a shackle, said piston member being mounted in said housing so as to enable rotation of said piston member about the axis of the rod of the piston member; and
    a coil spring surrounding a portion of said rod of said piston member, said coil spring being of cylindrical shape and said piston member and said coil spring being received in a further, cylindrical cavity in said housing such that a first end of said coil spring abuts said flange of said piston member and a second, opposite end of said coil spring abuts an inwardly facing end wall of said further cavity whereby a pulling force of sufficient magnitude exerted on said rod will cause compression of said coil spring by said flange of said piston member to produce dampening of the pulling force.

13. A device according to claim 12 wherein said housing is fabricated of urethane.

14. A device according to claim 12 further comprising a cylindrical casing received in said further cavity and surrounding said piston member and said coil spring.

15. A device according to claim 14 further comprising a first seal member received in a second further cavity in said housing at a first end of housing and surrounding a portion of the rod of said anchor member, and a second seal member received in a third further cavity in said housing at a second, opposite end of said housing and surrounding a portion of the rod of said piston member.

16. A device according to claim 12 wherein said seal means comprises respective mating grooves respectively formed in said mating surfaces and an o-ring sealing gasket received in said mating grooves.

17. A device according to claim 12 wherein said flanges comprise flat cylindrical plates centered on said rod.

18. A device according to claim 12 wherein said three flanges include a distal flange at the distal end of the rod of the anchor member opposite to said one end and wherein said distal flange is received in said further cavity in said housing.

* * * * *